United States Patent [19]

Abeille

[11] Patent Number: 4,825,798

[45] Date of Patent: May 2, 1989

[54] MONOCOQUE DECKING WITH STONE SURFACE, FOR FLOATING DOCKS AND THE LIKE, AND METHOD OF MAKING SAME

[75] Inventor: Gerald P. Abeille, Braintree, Mass.

[73] Assignee: Abeille Incorporated, Weymouth, Mass.

[21] Appl. No.: 61,944

[22] Filed: Jun. 11, 1987

[51] Int. Cl.[4] .............................................. B63B 35/36
[52] U.S. Cl. .................................. 114/267; 264/241; 156/279
[58] Field of Search ............... 114/263, 264, 266, 267, 114/355, 357, 359; 156/257, 279, 295, 258, 315, 330, 245; 52/181, 811; 264/241, 257, 266, 771, 273, 276, 320

[56] References Cited

U.S. PATENT DOCUMENTS

| | | | |
|---|---|---|---|
| 3,879,245 | 4/1975 | Fetherstone et al. | 264/241 |
| 3,922,413 | 11/1975 | Reineman | 428/119 |
| 3,942,199 | 3/1976 | Kollsman | 4/582 |
| 4,078,348 | 3/1978 | Rothman | 52/309.7 |
| 4,119,750 | 10/1978 | Porter | 14/357 |
| 4,235,948 | 11/1980 | Holmes | 428/15 |
| 4,268,574 | 5/1981 | Peccenini et al. | 428/315.5 |
| 4,289,172 | 9/1981 | Ekstrom | 138/149 |
| 4,339,291 | 7/1982 | Ekstrom | 156/195 |
| 4,418,634 | 12/1983 | Gerbus | 114/263 |
| 4,555,292 | 11/1985 | Thompson | 114/263 |
| 4,660,495 | 4/1987 | Thompson | 114/263 |

Primary Examiner—Sherman D. Basinger
Assistant Examiner—Jesus D. Sotelo

[57] ABSTRACT

A monocoque decking has a surface of cured polymeric material, and a selected quantity of stone particles of predetermined nature disposed and fixed thereupon. A method of forming the decking is also described.

14 Claims, 2 Drawing Sheets

MONOCOQUE DECKING WITH STONE SURFACE, FOR FLOATING DOCKS AND THE LIKE, AND METHOD OF MAKING SAME

This invention relates to decking for floating docks, which in the past has for the most part consisted of wooden slats requiring periodic replacement.

SUMMARY OF THE INVENTION

According to one aspect of the invention, a method for forming a monocoque decking having a pattern of stone disposed thereupon comprises the steps of: providing a mold of desired shape, preparing the mold for release of a molded article formed therein, dispersing a selected quantity of stone particles of predetermined nature upon a surface of the mold, coating the stone particles and mold surface with a gelcoat and curing the gelcoat to hold the particles in place in the mold, wetting the mold with resin, applying a heavy, chopped-strand mat to the resin, wetting out the mat and rolling out entrapped air to form a first laminate, positioning a core of material upon the wetted laminate, folding the laminate about the core and rolling out entrapped air.

In preferred embodiments, the method comprises one or more further steps. For example, for forming a monocoque decking of relatively large surface area, before positioning of the core, at least one additional laminate is formed over the first laminate by applying a roving to an underlying wetted laminate, wetting out the roving and rolling out entrapped air. Further steps include wetting with resin the surface of the core and the laminate folded thereabout exposed in the mold, applying a heavy, chopped-strand backup mat to the resin, wetting out the mat and rolling out entrapped air to form a backup laminate, and curing the resin. Preferably the method includes trimming edges of the decking and applying a gel coat to seal all glass strands. Other steps include selecting the stone particles on the basis of particle size, color, or shape; disposing the stone particles in a predetermined count per surface area, or in a predetermined pattern; and coating the gelcoat with a second layer of gelcoat and curing the second gelcoat layer, preferably the second gelcoat layer having thickness in the range of about 0.020 to 0.030 inch. The core is balsa or expanded material, preferably polyurethane or polyester.

According to another aspect of the invention, a monocoque decking comprises a surface of cured polymeric material and, disposed and fixed thereupon, in a desired pattern, a selected quantity of stone particles of predetermined nature.

In preferred embodiments of this aspect of the invention, the surface of the decking with the stone particles thereupon comprises a cured layer of gelcoat; the stone particles are of a predetermined size, color, or shape; the stone particles are disposed upon the decking in a predetermined count per surface area; and the monocoque decking further comprises a core of balsa or expanded material.

Thus there is provided a decking surface that provides an improved gripping surface for walking, and offers extended wear and requires much less maintenance than traditional decking for floating docks and marinas.

These and other objectives and features of the invention will be understood from the following description of a preferred embodiment, and from the claims.

PREFERRED EMBODIMENT

We first briefly describe the drawings.

Figure 1:
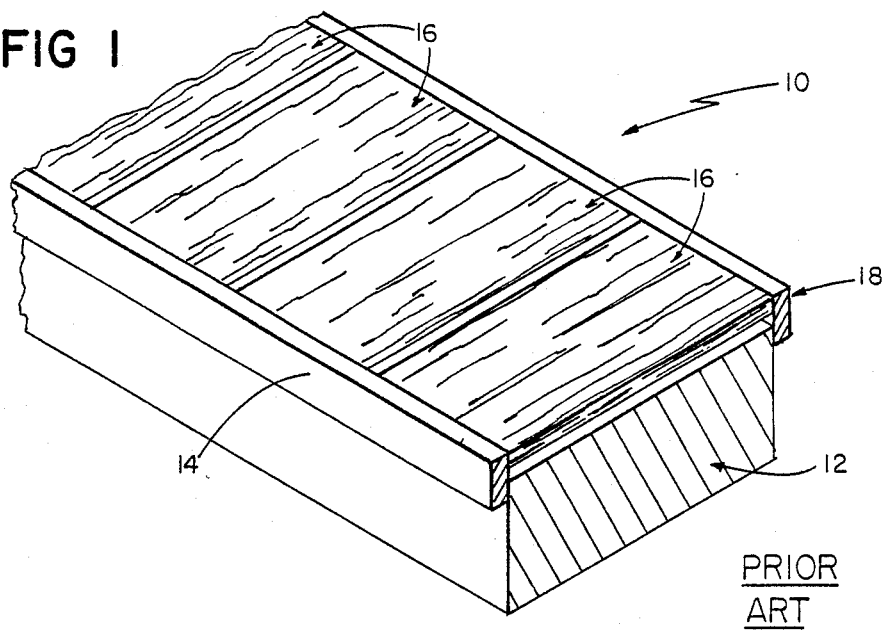
FIG. 1 is a perspective view of a prior art floating dock, with wooden slat decking.

Referring briefly to FIG. 1, a prior art floating dock 10 consists of float 1, chassis 14 and decking 16, typically wooden slats extending between side frames 18. The wooden slats are, of course, fully exposed to all weather conditions, as well as to pedestrian and other traffic, and require continuous maintenance and periodic replacement.

Figure 2:
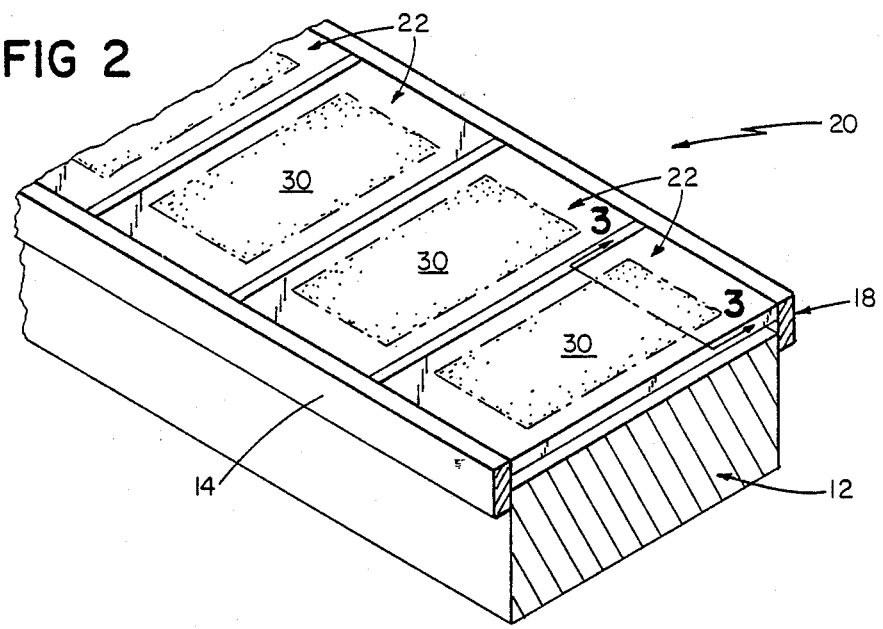
FIG. 2 is a perspective view of a floating dock with monocoque decking of the invention.
Figure 3:
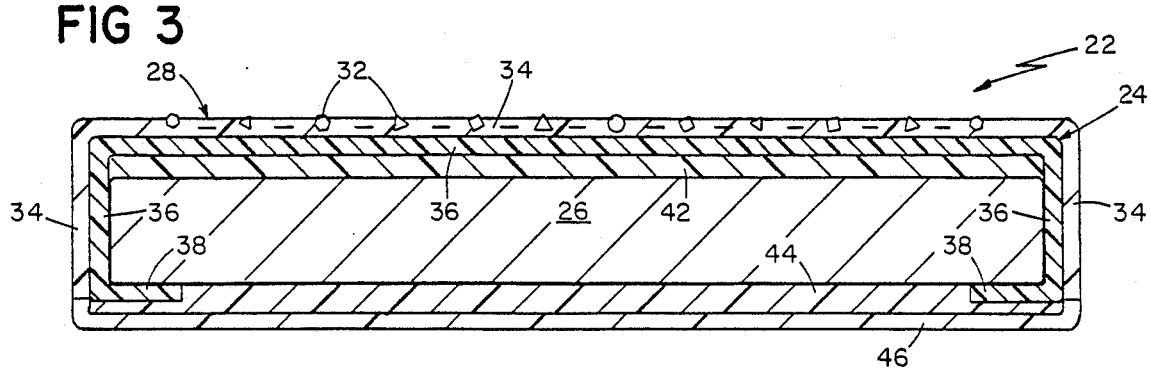
FIG. 3 is a side section view of the decking of the invention taken at the line 3—3 of FIG. 2.

Referring now to FIGS. 2 and 3, a floating dock 20 with monocoque decking 22 of the invention is shown. Decking 22 consists of a fiberglass body 24 formed by molding, as described below, about core 26, e.g., balsa, or expanded material such as polyurethane foam. The upper deck surface 28 of decking 22 includes areas 30 of stone laid out in a predetermined pattern, and providing a safe walking surface that is less subject to wear and deterioration than the wooden slat decking it replaces.

Figure 4:
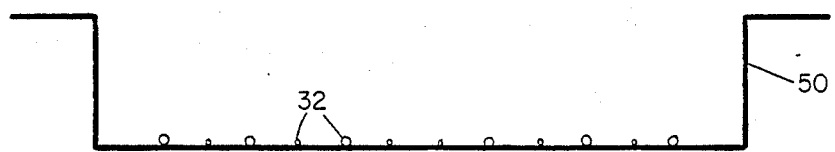
FIGS. 4 through 10 are sequential diagrammatic representations of the process for forming the decking of the invention.

Referring to FIG. 3, showing the decking in lateral cross-section (the longitudinal cross-section has the same construction), and also to FIG. 4 et seq., the stone-surfaced decking 22 of the invention is formed in a fiberglass mold 50, made by standard methods to the shape and pattern of decking 22 desired. The mold is prepared for release, and stone 32 of predetermined size, shape, and color is sprinkled onto the mold inner surface and arranged in the desired pattern and stone count per square inch (FIG. 4).

Figure 5:
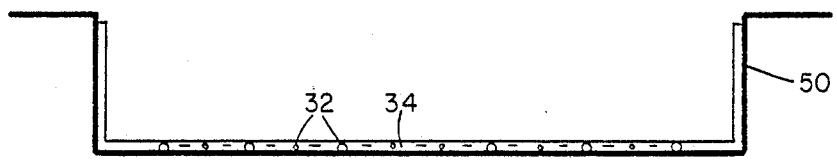

The mold surface and stone are sprayed lightly with a polyester gelcoat 34 (clear, or colored if desired) and the gelcoat allowed to cure, thereby securing the stone in place. After curing, a second layer of gelcoat, about 0.020 to 0.030 inch thick, is applied and cured (FIG. 5).

Figure 6:
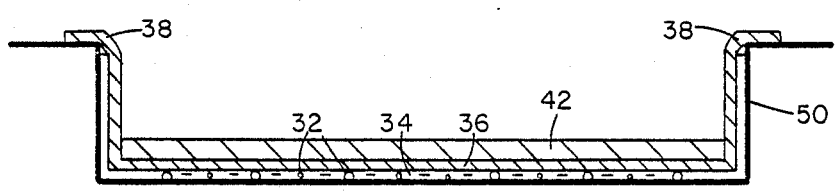

The cured gelcoat in the mold is wetted with polyester resin and a heavy, chopped-strand fiberglass mat applied. The mat is wetted out and rolled out by usual procedures to release entrapped air, to form a first laminate 36. Additional laminates 42 may also be formed upon the first laminate, e.g., where added strength is desirable, e.g., for decking of relatively greater surface area, by applying roving to the underlying wetted laminate, wetting out the roving and rolling out entrapped air (FIG. 6).

Figure 7:
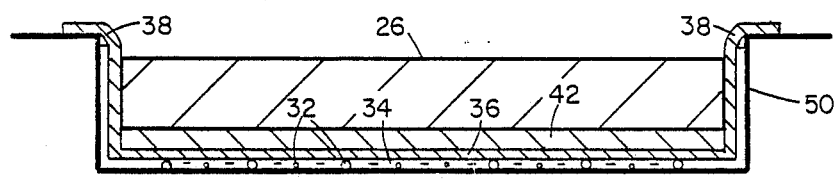
Figure 8:
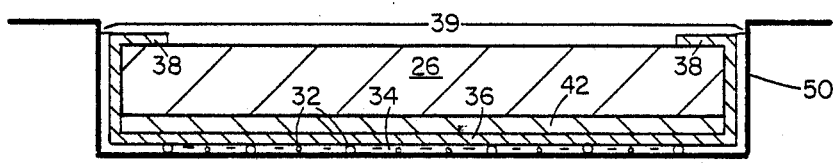

The core 26 of balsa or other expanded material, e.g., polyurethane or polyester, is placed in the mold (FIG. 7). The ends 38 of the wetted laminate are folded over the edges of the core and rolled out to release entrapped air and thus ensure good core-to-laminate surface contact (FIG. 8).

Figure 9:
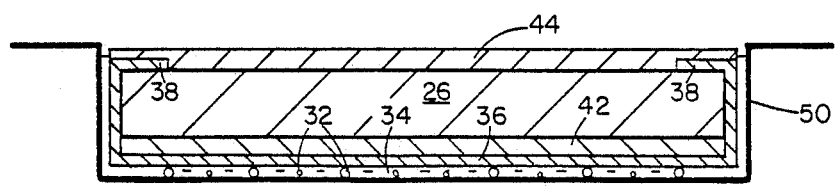
Figure 10:
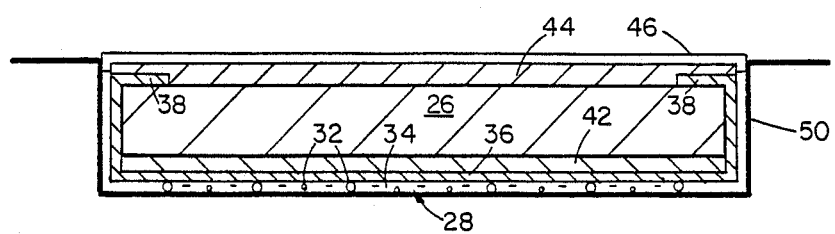

The upper surface 39 of the core in the mold (the lower surface in use) is wetted with polyester resin and covered with a backup mat of heavy, chopped strand fiberglass. The mat is wetted out and rolled to release entrapped air to form a backup laminate 44 (FIG. 9). Exposed edges are trimmed, and polyester gelcoat 46 is applied over the undersurface of the decking and cured to seal all glass strands (FIG. 10).

The completed decking 22 (FIG. 3) is removed from the mold and assembled in, e.g., the floating dock 20 (FIG. 2).

These and other embodiments are within the following claims. For example, the decking of the invention may be employed for marina walkways, boat walkways, or even galley floors.

What is claimed is:

1. A method for forming a monocoque decking having a pattern of stone disposed thereupon comprises the steps of:

providing a mold of desired shape, preparing the mold for release of a molded article formed therein, dispersing a selected quantity of stone particles of predetermined nature upon a surface of the mold, coating said stone particles and mold surface with a gelcoat and curing said gelcoat to hold said particles in place in the mold, wetting the mold with resin, applying a heavy, chopped-strand mat to said resin, wetting out said mat and rolling out entrapped air to form a first laminate, positioning a core of material upon the wetted laminate, folding said laminate about said core and rolling out entrapped air.

2. The method of claim 1, for forming a monocoque decking of relatively large surface area, comprising the further step, before positioning of said core, of forming at least one additional laminate over said first laminate, comprising applying a roving to an underlying wetted laminate, wetting out said roving and rolling out entrapped air.

3. The method of claim 1 comprising the further steps of:

wetting with resin the surface of said core and said laminate folded thereabout exposed in said mold, applying a heavy, chopped strand backup mat to said resin, wetting out said mat and rolling out entrapped air to form a backup laminate, and curing said resin.

4. The method of claim 3 comprising the further steps of trimming edges of said decking and applying a gel coat to seal off the chopped-strand mats.

5. The method of claim 1 further comprising selecting said stone particles on the basis of particle size.

6. The method of claim 1 further comprising selecting said stone particles on the basis of particle color.

7. The method of claim 1 further comprising selecting said stone particles on the basis of particle shape.

8. The method of claim 1 further comprising disposing said stone particles in a predetermined count per surface area.

9. The method of claim 1 further comprising dispersing said stone particles in a predetermined pattern.

10. The method of claim 1 further comprising coating said gelcoat with a second layer of gelcoat and curing said second gelcoat layer.

11. The method of claim 1 wherein said second gelcoat layer has thickness in the range of about 0.020 to 0.030 inch.

12. The method of claim 1 wherein said core is balsa.

13. The method of claim 1 wherein said core is of expanded material.

14. The method of claim 13 wherein said expanded material is selected from the group consisting of: polyurethane and polyester.

* * * * *

UNITED STATES PATENT AND TRADEMARK OFFICE
CERTIFICATE OF CORRECTION

PATENT NO. : 4,825,798

DATED : May 2, 1989

INVENTOR(S) : Gerald P. Abeille

It is certified that error appears in the above-identified patent and that said Letters Patent is hereby corrected as shown below:

Column 2, line 14, "1" should be --12--.

Column 2, line 35, after "desired" insert --.--.

Column 2, line 63, "chopped strand" should be --chopped-strand--.

Column 4, line 5, claim 3, "chopped strand" should be --chopped-strand--.

Column 4, line 11, claim 4, after "off" insert --glass strands of--.

Column 4, claim 11, line 26, "claim 1" should be --claim 10--.

Signed and Sealed this

Twenty-seventh Day of February, 1990

*Attest:*

JEFFREY M. SAMUELS

*Attesting Officer*   *Acting Commissioner of Patents and Trademarks*